United States Patent
Venkatakrishnan et al.

(10) Patent No.: US 12,296,260 B1
(45) Date of Patent: May 13, 2025

(54) MOBILE DEVICE APPLICATION USER INTERFACE FOR GAMING, ENTERTAINMENT, AND OTHER APPLICATIONS HAVING GEOGRAPHIC GESTURE-BASED INPUT FUNCTIONALITY

(71) Applicant: YellCast, Inc., San Carlos, CA (US)

(72) Inventors: Ganesan Venkatakrishnan, San Carlos, CA (US); Peter Ellenby, Portland, OR (US); Thomas William Ellenby, Langhorne, PA (US); William Foster, Santa Fe, NM (US); Peter Negulescu, San Francisco, CA (US)

(73) Assignee: Yellcast, Inc., San Carlos, CA (US)

( * ) Notice: Subject to any disclaimer, the term of this patent is extended or adjusted under 35 U.S.C. 154(b) by 473 days.

(21) Appl. No.: 17/463,413

(22) Filed: Aug. 31, 2021

(51) Int. Cl.
*A63F 13/428* (2014.01)
*A63F 13/216* (2014.01)
*A63F 13/92* (2014.01)
*G06F 3/01* (2006.01)

(52) U.S. Cl.
CPC .......... *A63F 13/428* (2014.09); *A63F 13/216* (2014.09); *A63F 13/92* (2014.09); *G06F 3/017* (2013.01); *A63F 2300/6045* (2013.01)

(58) Field of Classification Search
None
See application file for complete search history.

(56) References Cited

U.S. PATENT DOCUMENTS

| | | | | |
|---|---|---|---|---|
| 11,201,981 B1* | 12/2021 | Suiter | | G06V 20/35 |
| 11,331,571 B2* | 5/2022 | Dugan | | A63F 13/42 |
| 2004/0259617 A1* | 12/2004 | Machida | | A63F 13/10 463/5 |
| 2005/0049022 A1* | 3/2005 | Mullen | | A63F 13/12 463/1 |
| 2006/0105838 A1* | 5/2006 | Mullen | | A63F 13/65 463/31 |
| 2006/0252541 A1* | 11/2006 | Zalewski | | A63F 13/215 463/36 |
| 2006/0264260 A1* | 11/2006 | Zalewski | | A63F 13/213 463/36 |
| 2007/0033012 A1* | 2/2007 | Rosenberg | | G06F 3/0346 704/E15.041 |
| 2008/0174550 A1* | 7/2008 | Laurila | | A63F 13/24 345/158 |

(Continued)

*Primary Examiner* — Tramar Harper
(74) *Attorney, Agent, or Firm* — Haynes and Boone, LLP

(57) ABSTRACT

A computer-implemented method for generating inputs to a game software application might comprise obtaining sensor inputs from a set of sensors of a user device, the set of sensors comprising a first set of sensors and a second set of sensors, determining, from a first set of signals from the first set of sensors, and a gesture definitions ruleset, a gesture, generating a gesture message corresponding to the gesture, determining, from a second set of signals from the second set of sensors, a position data structure corresponding to position details of the user device, generating a position message corresponding to the position details, providing the gesture message and the position message to a game move determining module, determining, from the gesture message, the position message, and a gesture-to-move mapping table, a game move, generating a game move message, and providing the game move message to an input portion of the game software application.

3 Claims, 11 Drawing Sheets

(56) References Cited

U.S. PATENT DOCUMENTS

| | | | |
|---|---|---|---|
| 2009/0005140 A1* | 1/2009 | Rose | A63F 13/65 463/40 |
| 2009/0262074 A1* | 10/2009 | Nasiri | G06F 3/04817 345/158 |
| 2010/0216490 A1* | 8/2010 | Linden | H04M 1/72457 455/456.3 |
| 2011/0021272 A1* | 1/2011 | Grant | G08B 6/00 463/30 |
| 2012/0058783 A1* | 3/2012 | Kim | G06F 1/1694 455/418 |
| 2012/0105225 A1* | 5/2012 | Valtonen | G01S 19/47 340/539.13 |
| 2012/0244945 A1* | 9/2012 | Kolo | A63F 13/58 463/42 |
| 2012/0253489 A1* | 10/2012 | Dugan | G06V 40/23 700/91 |
| 2013/0303281 A1* | 11/2013 | Argiro | A63F 13/335 463/31 |
| 2014/0024394 A1* | 1/2014 | Siders | A63F 13/216 455/456.3 |
| 2014/0139455 A1* | 5/2014 | Argiro | G06F 1/1632 345/173 |
| 2015/0120408 A1* | 4/2015 | Liu | G06Q 30/0209 705/14.12 |
| 2018/0008887 A1* | 1/2018 | Nitta | A63F 13/825 |
| 2021/0092550 A1* | 3/2021 | Ganesan | G06Q 20/327 |

\* cited by examiner

MOBILE DEVICE APPLICATION USER INTERFACE FOR GAMING, ENTERTAINMENT, AND OTHER APPLICATIONS HAVING GEOGRAPHIC GESTURE-BASED INPUT FUNCTIONALITY

FIELD

The present disclosure generally relates to user interfaces and more particularly to a user interface for a computer application that accepts user actions defined based on gestures and device position.

BACKGROUND

For some computer applications, it would be desirable to have inputs that are provided in context of local geography as well as based on user gestures performed using a user device executing the computer application. For example, game applications accept user input in the form of game moves. For example, in a game, a user might draw a circle on a touchscreen and the game application would receive that draw action from an input system or an operating system and the game application would respond to that circle according to some predetermined set of game rules.

Some computer applications, such as mapping and direction-giving applications that run on a user mobile device, can provide position-specific actions. For example, a user might specify a particular building to a map application on a user device and the map application would respond with directions to that particular building by first determining a present geolocation of the user device and then displaying a path from that present geolocation to the building.

Improved user interfaces can make applications, such as game applications, more engaging and contextual.

SUMMARY

A mobile user device that runs applications might run an application that accepts input actions where an input action might be determined from stored lookup data, such as cross-reference matrices and rulesets, a gesture made by a user of the mobile user device, and position data indicative of a geolocation, orientation, etc. of the user mobile device. Where the application is a game application, the input action might be a game move in the context of the game represented by the game application.

A computer-implemented method for generating inputs to a game software application might comprise obtaining sensor inputs from a set of sensors of a user device, the set of sensors comprising a first set of sensors and a second set of sensors, determining, from a first set of signals from the first set of sensors, and a gesture definitions ruleset, a gesture, generating a gesture message corresponding to the gesture, determining, from a second set of signals from the second set of sensors, a position data structure corresponding to position details of the user device, generating a position message corresponding to the position details, providing the gesture message and the position message to a game move determining module, determining, from the gesture message, the position message, and a gesture-to-move mapping table, a game move, generating a game move message, and providing the game move message to an input portion of the game software application.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the surface computation method, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which.

DETAILED DESCRIPTION

Figure 1:
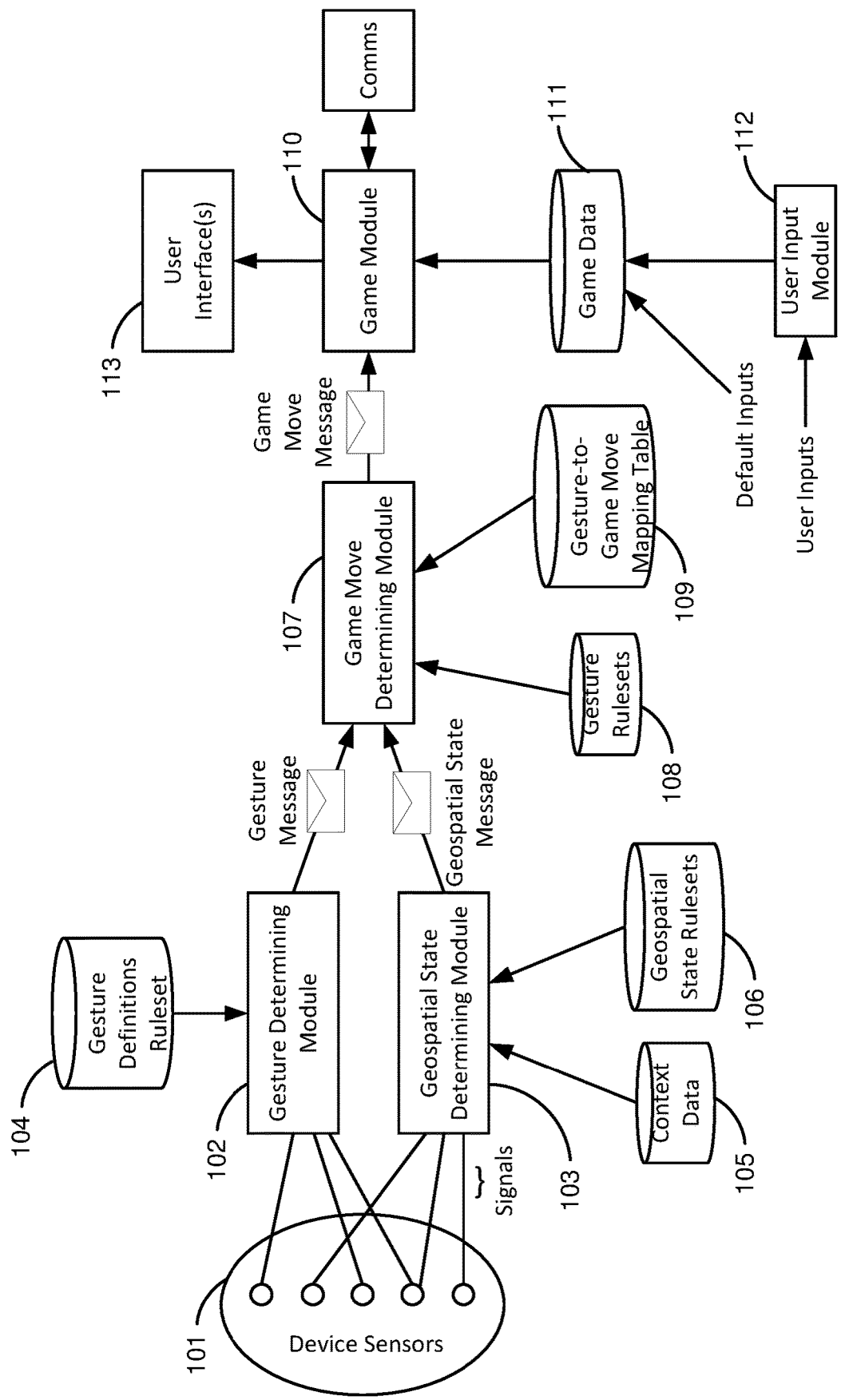
FIG. 1 illustrates is a system of elements of a user device as might be used in an embodiment of a user device, according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In some embodiments, a user device is a mobile device capable of executing software applications that are configured to receive user inputs. One example of a software application is a game software application that is configured to receive user inputs that can be considered game moves within the game play implemented by the game software application. As explained herein, a game move that is input to the game software application might be based on a gesture made by the user of the user device, as detected by the user device's sensors and the current geospatial state of the user device as determined by the various sensors associated with the user device that monitor its physical state. Examples include a position determining means or apparatus (e.g., GPS module), a heading sensor (e.g., a flux gate compass), etc. In some embodiments, the game move or another game operation might be a function of gesture, determined position of the user device, and detected local conditions (such as windspeed) that are detected by the user device or determined from external information sources, such as a weather server. While many examples here refer to a game move input for a game software application, it should be understood that the teachings here might also apply to game inputs that are not strictly game move inputs (e.g., altering the path of a tennis ball in a tennis game based on windspeed and weather obtained from a weather service server) and might also apply to applications that are not considered games.

In general, a user device might be an electronic device having an interface with which a user can interact. The electronic device might be mobile (e.g., can be used while in motion) or portable (e.g., might be used in motion, but might only be used in stationary operation but be easily moved from place to place between uses). Examples of user devices include smartphones, tablets, watches, etc. The user device may include a set of sensors to detect various events. Some events are gesture events wherein the user manipulates the user device in some way that can be detected by the sensors. The set of sensors might include a first set of sensors that are used to determine a gesture when a user makes a gesture (or at some other time) and a second set of sensors that are used to determine a position for the user device. The set of sensors might include some sensors that are in the first set of sensors and also in the second set of sensors. Examples of sensors include accelerometers, gyroscopes, or other internal sensors used to determine a device's spatial state and/or motion or other events. Other sensors might determine a position of the user device, such as include GPS, AGPS or other position sensing technology and the device's compass bearing (pointing direction) as determined by the mobile device's compass or other means of determining pointing direction. While various sensors might operate in various manners, in examples herein, sensors or sensor systems output signals indicative of what is being sensed. For example, an accelerometer might output a signal representative of an acceleration vector corresponding to acceleration detected by the user device. A GPS sensor might output a signal representative of a geographic position determined by the GPS sensor using known GPS techniques.

Device position might refer to a geolocation of the user device, a position relative to a reference marker, an orientation of the user device relative to a compass direction or a direction defined by two, three, or more markers. Orientation and geolocation can be in two dimensions, in three dimensions or other dimensions as appropriate.

A gesture might be a detected action that the user device detects, based on signals from the sensors. The user device might have a gesture detecting module specifically for gesture detecting, or it might be part of other functionality of the user device to supply programs running on the user device with messages indicating what gestures the user device detected.

One example of a gesture is a "cast" that is a gesture made by the user of the user device much like a motion of casting a fishing rod. For example, the user might rotate the user device along a vertical plane or along a horizontal plane. A gesture determining module might be programmed to determine that some movement is a cast based on whether rotations traverse some angle at some rate. For example, movements through less than a predetermined minimum angle might be deemed not to be casts, rotations that occur with a rotation rate that is less than a predetermined minimum rotation rate might be deemed not to be casts, or some combination rotation angle and rotation rate might be used to determine whether a cast occurred. The thresholds can be preprogrammed and fixed or may be user-settable. In some embodiments, the user device learns over time what constitutes a cast.

Other gestures might also be considered, such as a side-to-side slash gesture. Some gestures may initiate geographic-based actions and interactions in 360 degrees around a user.

Another example of a gesture is a vertical or horizontal motion in one or more combination or variation, or a sequence thereof, such as diagonal slashing motions, vertical motions while moving the mobile device upwards in a slashing or casting motion, wiggling motions moving the mobile device side-to-side while casting, etc.

By monitoring the sensors (e.g., compass and accelerometers) of the user device, the user device operating system or other programming can determine the position of the user device. Based on the gesture and the position, the operating system or gesture-detecting programming of the user device, and possibly based on other sensors, can generate an output representative of a local geographic based action and/or interaction in a specific direction.

A response to a game move (or other input action that is based on a gesture and a position) might be connected to a point of interest ("POI") that a POI data structure might indicate are at the position of the user device or nearby the user device's geographic position. In some cases, a POI database is used and entries in the POI database indicate POIs and ranges of positions that are deemed without the bounds for that POI. POIs might represent real-world objects such as buildings, restaurants, parks, etc., might represent actual mobile or stationary objects such as people, animals, and vehicles, and/or might represent virtual objects such as a geolocated gaming object.

A combination of a gesture and a position where that gesture was made is referred to herein as a "geogesture" of the user device. Whether the geogesture is determined by the user device operating system or a gesturing subsystem of an application or otherwise, an output of the determiner is referred to herein as a "geogesture message". A geogesture message might be passed as an input to a game application, as an input to a game move determining module that determines a game move that should be emitted for a give geogesture. The geogesture might result in a geographically-based action and/or interaction being made possible in relation to specific POIs within a defined geographic area of the geogesture.

Some POIs might be game-specific gaming POIs. Examples of gaming POIs might include real-world objects such as buildings or statues that have known geolocations. Gaming POIs might also include virtual gaming objects that are assigned to specific geolocations or to a geolocation path. A geolocation path might be represented in a game or computer memory to define a path from one geolocation to one or more other geolocations. A geolocation path might correspond to a path taken by a mobile object, a mobile person, a moving vehicle, etc. A gaming POI might represent an object that historically had a particular geolocation or geolocation path but is no longer present at that position or along that path.

A game application might specify a game environment within which a game is played, and game play might depend upon geogestures, a defined geographic area, gaming POIs, and virtual gaming assets that are part of the game. A game field might be an in-game space in which actions occur and the game field might correspond to a real-world space, perhaps the real-world space occupied by a user with the user device.

A game module or game application might comprise hardware and/or software that implements game functionality. A game move might comprise an input message to a gaming program application that the gaming program application understands as a valid move in a game at a given state of the game. Examples of game moves might include "Launch," "Look," "Leave," and "React."

In the specific implementation of a game, the "Launch" game move might be interpreted by the game application as a player move in which a virtual gaming object is sent, fired (as in a first-person shooter), or launched in the game field wherein parameters of a launch move message correspond to elements of the geogesture. For example, if the geogesture is such that the user was pointing their user device north while making a gesture, the launch in the game would be into a northerly direction. Where the geogesture was determined to be directed at a particular in-game POI, the launch in the game might be directed at that POI in the game.

In the specific implementation of a game, the "Look" game move might result in the game responding with information about a gaming POI hat was gestured towards.

In the specific implementation of a game, the "Leave" game move might result in the game player leaving a part of the game field or depositing a gaming element in the game field to be associated with a gaming POI associated with the geogesture. The "Leave" game move might allow for creating gaming POIs created and left at a position in the game field by a geogesture or a combination of geogestures.

In the specific implementation of a game, the "React" game move is interpreted as a player response to a gaming element, perhaps one that has been launched by another player or generated by the gaming environment. The "React" game move might be a move to defend against, reflect or bounce a gaming element.

Some game moves might trigger other game moves and a geogesture might be processed into a sequence of two or more game moves. For example, one geogesture might be interpreted as a "Launch" move followed by a "Leave" move or a "Look" move within the gaming environment.

SPECIFIC EXAMPLES OF GAME MOVES AND GAME PLAY

For the purposes of illumination of examples, some game moves and resulting game play are described. It should be understood that geogestures and game moves in these examples are not exhaustive.

One example of a "Launch" move is where a game player is playing a geolocational game in a particular city, a city that might be popular with tourists and has several landmarks around the city. Game play might be that the player is placed in a game field corresponding to the city and the premise of the game is that monsters have invaded and taken over major buildings and tourist sites in the city. The player engages with the gaming environment by geogesturing at the gaming POIs (e.g., buildings and positions) where they believe the monsters are located and launching virtual rockets at those POIs. They may be aided by a map that shows the positions of the monsters. As they geogesture and launch the rockets their success of monster kills is tracked. The game might be played passively as the user goes about their daily routine with the user device and moves around the city each day, or the game might have a time-based element.

In another example, a game is centered around players mainly launching things. In this game, all of the gaming POIs are virtual, so the game may be played anywhere in the world. The gaming POIs might be virtual insects that are distributed in the game around the entire globe. The insects might have static stationary geolocations or geolocational paths that they travel. A player's user device might run a gaming app and the player assigned an avatar of a creature that eats insects by flicking its tongue at the insects to catch them, such as a frog avatar or a lizard avatar for example. As the player moves around the gaming environment, they are informed of potential insects, gaming POIs, that may be in the area, perhaps using augmented reality or a map interface. Once they have located an insect, they geogesture their user device in the direction they believe the insect to be in in the hopes of catching the insect. The geogesture triggers a game move that results in the launching of a virtual tongue in the desired direction and the insect is caught. It may also be the case that the player launches their avatar's tongue randomly in hopes of catching an insect in the direction of the geogesture. Geogestures might be represented by geogesture data structures that include elements or parameters corresponding to a determined force of a gesture and a determined length of the gesture. Thus, the corresponding geogesture might convert to a game move that corresponds to the virtual tongue launching further or faster into the gaming environment to catch the insects as a function of the force element or length element.

In an example of the use of a "Look" game move, suppose a player is playing a geolocational game sponsored by a major fast-food restaurant chain, where the game might be available to be played in any country or locality where the restaurant operates. The game might be played by having the player hunt for, and find, ingredients of a signature hamburger offered by the fast-food restaurant chain by geogesturing at gaming POIs. The ingredients correspond to virtual elements of the gaming environment, such as buns (top and bottom), two hamburger patties, cheese, bacon, pickles, lettuce, tomato, ketchup, mustard, and an onion ring, each geolocated and hidden throughout the game field and placed in association with gaming POIs. There may be multiple game POI positions for each of the virtual ingredients. Once they are discovered by a player, they may not be available within that gaming POI for other players to find, or it may be possible for multiple players to discover the same ingredient at the same gaming POI. As players move about the gaming field, they can geogesture at objects, the gaming POIs, in hopes of discovering the ingredients for the hamburger. If they geogesture at a gaming POI where an ingredient was geolocated, they collect it. Players can continue doing this until all the ingredients are found and collected and they have built a virtual hamburger. The fast-food restaurant chain may offer those who collect all the ingredients and hence successfully build the "hamburger" some kind of coupon or perhaps even a free real version of the hamburger the player had built.

In an example of the use of a "Leave" game move, a user might play a geolocated game based that primarily uses the "Leave" geogesture. The game field might be seeded with virtual oil fields and the game requires users to create virtual oil wells, rigs, by geogesturing to where they believe the virtual oil field may be and extracting that virtual oil. The player may set the distance at which one of their virtual oil rigs will be positioned in the direction of their geogesture or the length and force of their geogesture may determine the distance that the rig is positioned in the direction of their geogesture. Players can move about the gaming field, leaving rigs where they believe the oil to be with geogestures. If they position their rigs over a virtual oil field, they are rewarded with points.

Other instances of a "Leave" game move function in a geogesturing gaming environment might be to leave items at exiting POIs, such as setting a trap for another gamer, leaving a clue for a scavenger hunt game and more. Another example of a "Leave" game move function may be that there is a game where people are the gaming POIs and the object is to geogesture at other gamers in the gaming environment and leave a tag, perhaps an emoji, on the player.

In an example of the use of a "React" game move, a game might involve two players in the game field who have challenged each other to a game of virtual geolocational tennis. The game begins with a geogesture that results in a "Launch" game move, triggering a serve of a virtual tennis ball by that player in the direction of the other player. The second player is informed the virtual ball is on its way and they must then react to its arrival with a geogesture and send it back to the first player. In the geogesture tennis match, the react geogesture, if made in the proper direction and time resulted in hitting the virtual ball, would result in a launch function, sending the ball back to the other player. Other reaction functions initiated by a geogesture may be to defend against an attack of some kind, deflect a virtual spear for example, or to catch a virtual object such as a baseball that was headed towards their position in the gaming environment.

In some contexts, a gaming geogesture results in a combination of the game moves. In specific embodiments, the four main game moves are launches, looks, leaves, and reacts. There may be instances where combined geogestures of two of more players could be used in geolocational gaming. For example, a game field proliferated with virtual monster POIs might provide that there are teams of monster hunters that are trying to eliminate them with launch function geogestures, firing virtual weapons at the monsters. If two or more players were to geogesture simultaneously, or close to the same moment, at one of the monster POIs the damage inflicted may be more severe. It may also be the case that the player's angle in relation to the monster POI could influence the damage inflicted. The monster POI may be assigned a geographic reference of their front, sides, and rear orientations and the launch game moves, either by one player or many simultaneously, would cause a different result on the monster POI. A launch game move with elements indicating the gesture was to the front of the monster POI might cause more damage to one at the rear, for example. There may also be case where a combination of launch game moves towards the POI cause certain results. If a four-player time simultaneously hit all four quadrants of a gaming POI, it may have a different result than if all for launch game moves directed to the rear of the POI.

There may also be factors from the real environment that may impact game play in the geogesture games such as weather (e.g., wind, rain, fog, etc.), time of day, season, local traffic and possibly more. For example, if it were particularly windy during the game of geogesture tennis, the gaming system may monitor the wind and the track of the virtual tennis balls once launched would be influenced by the direction of the wind. In the monster hunt game examples, it may be the case that it is easier to find monsters during daylight and harder to see them in during night hours as determined by the user device or query to a time-of-day server that indicates whether it is daytime or nighttime.

Game moves associated with a geogesture may be driven/pre-selected by the determined geographical position and/or pointing direction of a user device, e.g., if at position A then the Launch game move 1 is the default, the Leave game move 2 is the default, the Look game move 4 is the default, and the React game move 8 is the default and if at position B then the Launch game move 2 is the default, the Leave game move 3 is the default, the Look game move 5 is the default, and the React game move 1 is the default.

A matrix of position-based defaults may be created for the real-world area in which the geogesture enabled game was taking place and stored as a gesture-to-move mapping table. The same methodology could apply to pointing direction, e.g., if a user device is pointing between 90 and 270 degrees true then the game move sequence "Launch 1, Leave 3, Look 5, React 3" might be input to the game.

Both position and pointing direction may also be combined i.e., both the determined position and pointing direction of the user device may drive the selection of a default game move at a specific position when pointing in specific directions from that position.

In a simpler version, the position and/or pointing direction of the user device may only set the type of game move (Launch, Look, Leave or React) that is the default that will be deployed when any geogesture of the user device is detected in the gaming environment at that position, or when pointing in a specific direction, or a combination of both the position and pointing direction of the user device.

When an available position or pointing driven default game move is detected by the system, the system may react in one of several ways. It may automatically set the default to that associated with that position, pointing direction or both, it may set the default and inform the user of the system, i.e., the player of the game, or it may inform the user of an available default or defaults and ask them to confirm that they would like to make those the default or defaults. Additionally, when a change of the determined position and/or pointing direction of the user device initiates the availability of a different default game move or actions the system could either a) automatically change the default without informing the user, b) automatically change the default and inform the user of said change, or c) inform the user of the availability of a new default and ask the user to confirm the change.

EXAMPLES DESCRIBED IN FIGURES

FIG. 1 illustrates is a system 100 of elements of a user device as might be used in an embodiment of a user device. Element 101 comprises various sensors that monitor physical and spatial states of a user device. Such sensors may include but are not limited to, a position determining module, such as a Global Positioning System ("GPS") module, an attitude determiner, such as a flux gate compass or other two-dimensional or three-dimensional heading sensors, and accelerometers that determine an angular rate of change of one or more axes associated with the user device (i.e., pitch, roll and yaw). A gesture determining module 102 can monitor various signals produced by device sensors 101. If the signals match one or more predetermined gesture definitions stored as a gesture definition ruleset 104, gesture determining module 102 might send a gesture message to a game move determining module 107. Similarly, geospatial state determining module 102 can monitor the signals produced by device sensors 101 and send a geospatial state message, which might be a constantly updated geospatial state message. Geospatial state messages might be as defined by geospatial state rulesets 106 and other context data 105 (such as local weather conditions, time, date, etc.) and provided to a game move determining module 107. Game move determining module 107 can then determine if a received gesture message, or a received gesture message and geospatial state message, match a game move as defined in predetermined gesture rulesets 108 and a gesture-to-game move mapping table 109. If such a match is determined to exist, then game move determining module 107 can send a game move message to game module 110. Game module 110 can then implement a game move contained in the game move message according to stored game rulesets and data 111 (that may be modified by default inputs or user inputs via a user input module 112). An implemented game move may then be displayed, executed, or otherwise provided to a user of the system via a user interface 113 or transmitted to other systems via communications 114 associated with the system.

Figure 2:
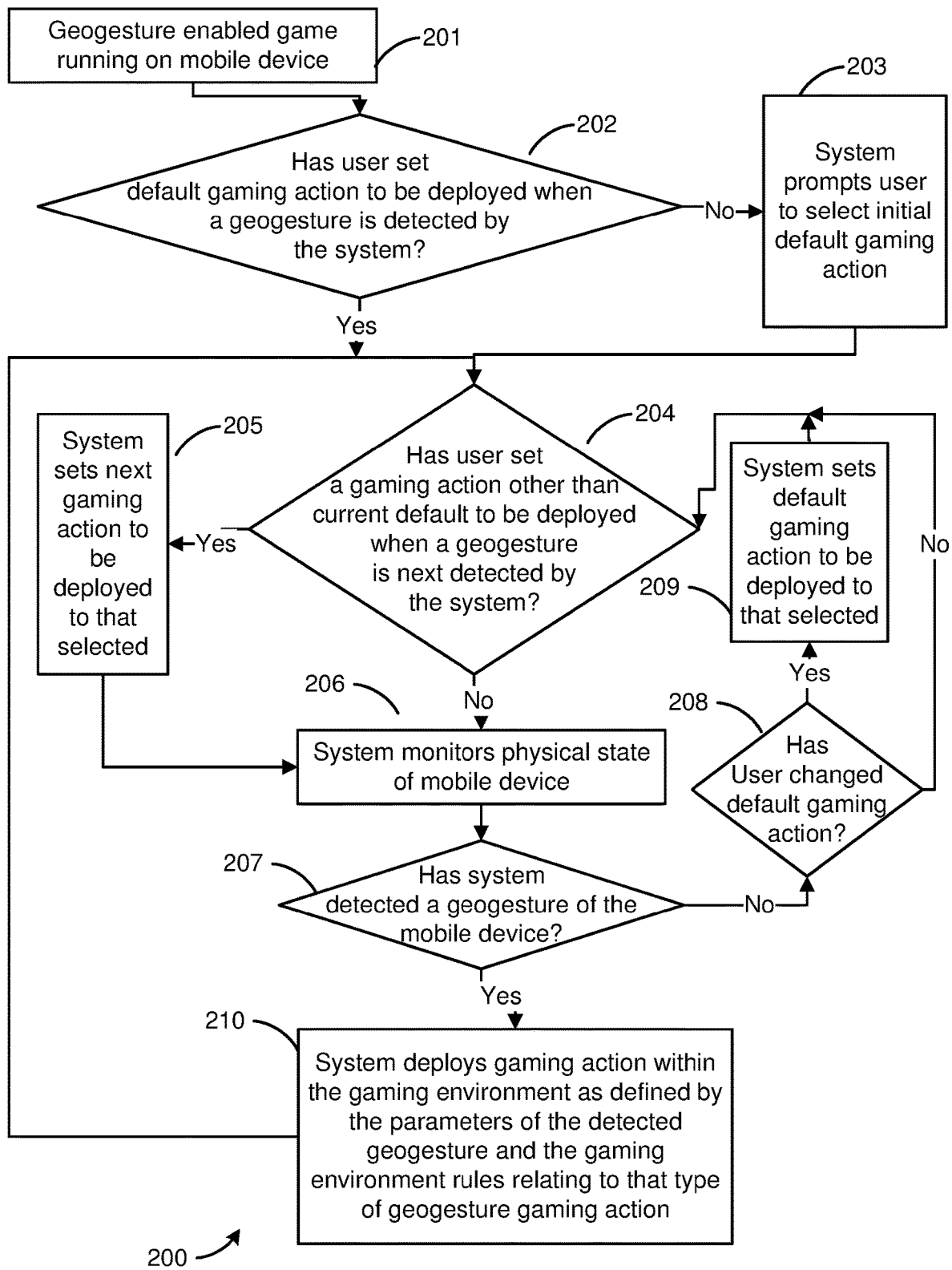
FIG. 2 is a flowchart illustrating a process for accepting user actions defined based on gestures and device position, according to an embodiment.

FIG. 2 is a flowchart 200 illustrating a possible mode of operation of a system of the invention. In step 201 a game that is enabled to utilize geogestures is running on a user device. The flowchart then branches to step 202. In step 202 the system determines if the user of the system, i.e., the player of the game, has defined a default game move to be deployed within the gaming environment if a geogesture is detected. If a default game move has not been defined the flowchart branches to step 203, in which the user is prompted to define the default game move to be associated with a geogesture, and then branches to step 204. If a default game move has been defined the flowchart branches to step 204. In step 204 the system determines if an alternate game move to be deployed when the next geogesture is detected has been defined by the user. If an alternate game move has been defined by the user the flowchart branches to step 205, in which the system sets the selected action as the action to be deployed when the next geogesture is detected, and then branches to step 206. If an alternate game move has not been defined by the user, the flowchart branches to step 206. In step 206 the system monitors the physical state of the user device (position, orientation, accelerations, etc.). The flowchart then branches to step 207 in which the system determines if a geogesture has been detected. If a geogesture has not been detected the flowchart branches to step 208 in which the system determines if the user has changed the default game move. If the user has not changed the default game move the flowchart branches back to step 204. If the user has changed the default game move the flowchart branches to step 209, in which the default game move is set to that selected, and then branches to step 204. If a geogesture has been detected the flowchart branches to step 210, in which the system deploys the game move within the gaming environment as defined by the parameters of the detected geogesture and the gaming environment rules relating to that type of geogesture.

Figure 3:
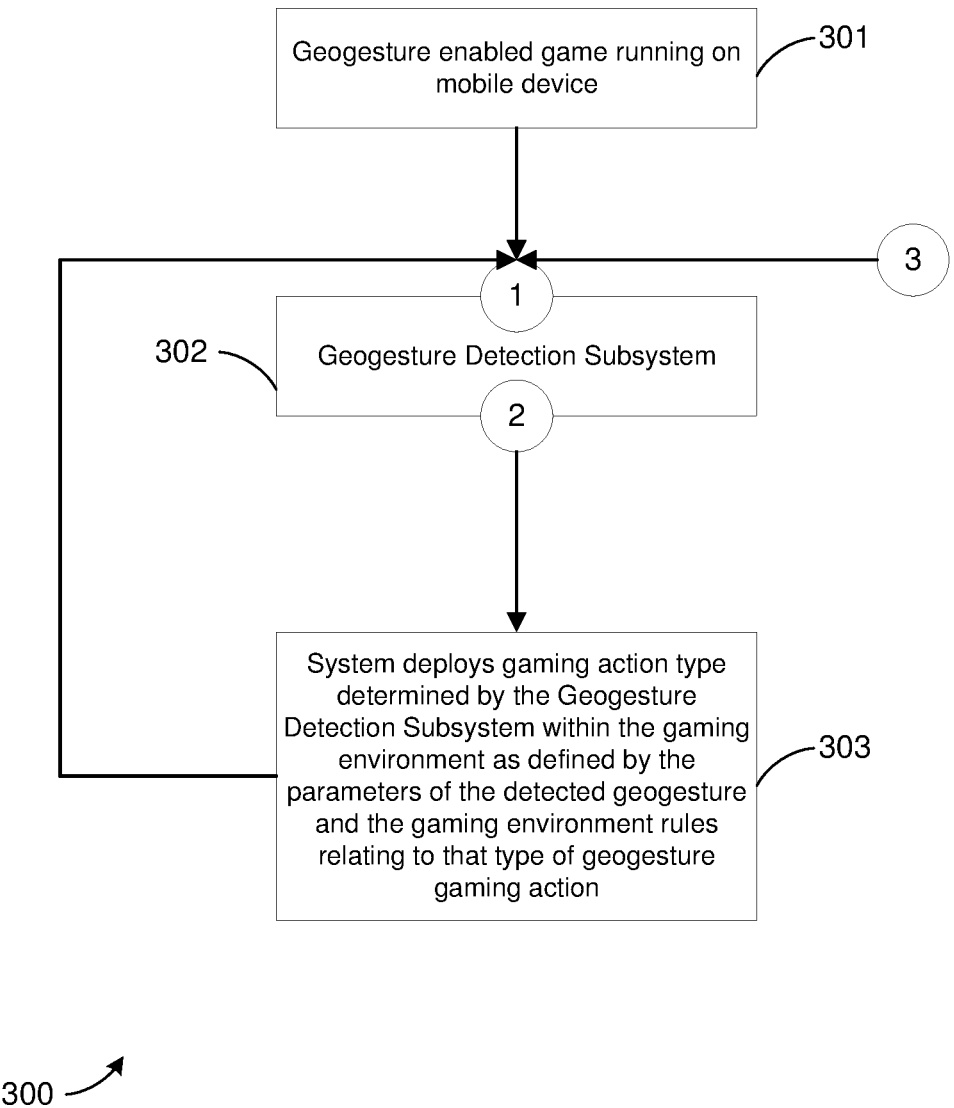
FIG. 3 is a flowchart illustrating a process for determining whether a gesture corresponds to a game move input, according to an embodiment.
Figure 4:
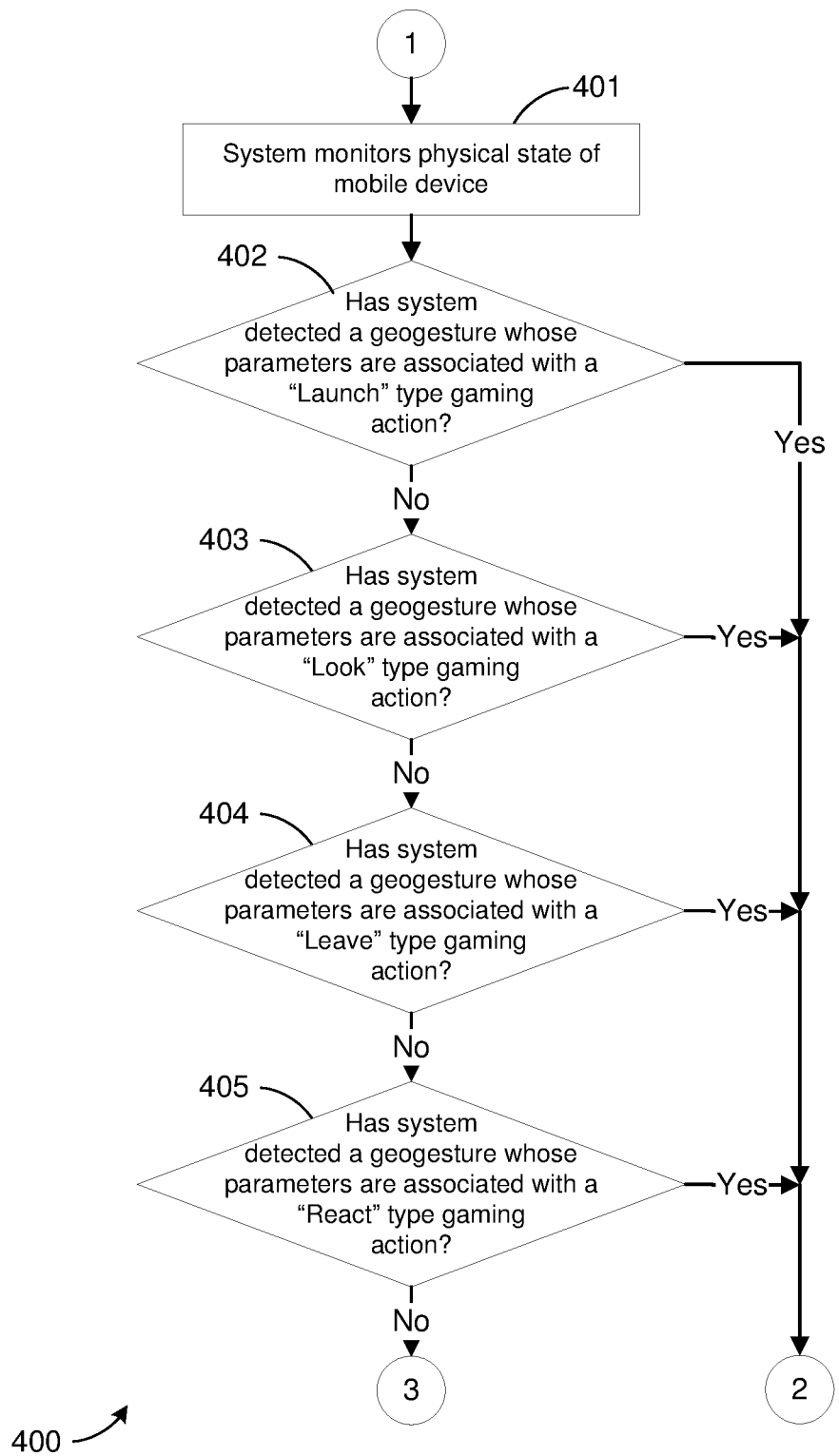
FIG. 4 is another flowchart illustrating another process for determining whether a gesture corresponds to a game move input, according to an embodiment.

FIGS. 3 and 4 are flowcharts 300, 400 illustrating another possible mode of operation of a system of the invention in which one or more of the detected parameters of the geogesture define which type of game move will be deployed. For example, a 90-degree vertical gesture may be associated with a "launch" type action. In step 301 a game that is enabled to utilize geogestures is running on a user device. The flowchart then branches to the Geogesture Detection Subsystem 302 via connector 1. From connector 1 the flowchart branches to step 401. In step 401 the system monitors the physical state of the user device (position, orientation, accelerations, etc.). The flowchart then branches to step 402 in which the system determines if the detected geogestures' parameters are those associated with a "Launch" type game move. If the detected geogestures' parameters are those associated with a "Launch" type game move the flowchart branches to step 303 via connector 2. If the detected geogestures' parameters are not those associated with a "Launch" type game move the flowchart branches to step 403. In step 403 system determines if the detected geogestures' parameters are those associated with a "Look" type game move. If the detected geogestures' parameters are those associated with a "Look" type game move the flowchart branches to step 303 via connector 2. If the detected geogestures' parameters are not those associated with a "Look" type game move the flowchart branches to step 404. In step 404 system determines if the detected geogestures' parameters are those associated with a "Leave" type game move. If the detected geogestures' parameters are those associated with a "Leave" type game move the flowchart branches to step 303 via connector 2. If the detected geogestures' parameters are not those associated with a "Leave" type game move the flowchart branches to step 405. In step 405 system determines if the detected geogestures' parameters are those associated with a "React" type game move. If the detected geogestures' parameters are those associated with a "React" type game move the flowchart branches to step 303 via connector 2. If the detected geogestures' parameters are not those associated with a "React" type game move the flowchart branches back to connector 1 via connector 3 and the system continues to monitor for geogestures. In step 303 the system deploys the game move associated with the parameters of the detected geogesture within the gaming environment as defined by the parameters of the detected geogesture and the gaming environment rules relating to that type of geogesture. The flowchart then branches back to connector 1 and the system continues to monitor for geogestures.

Figure 5:
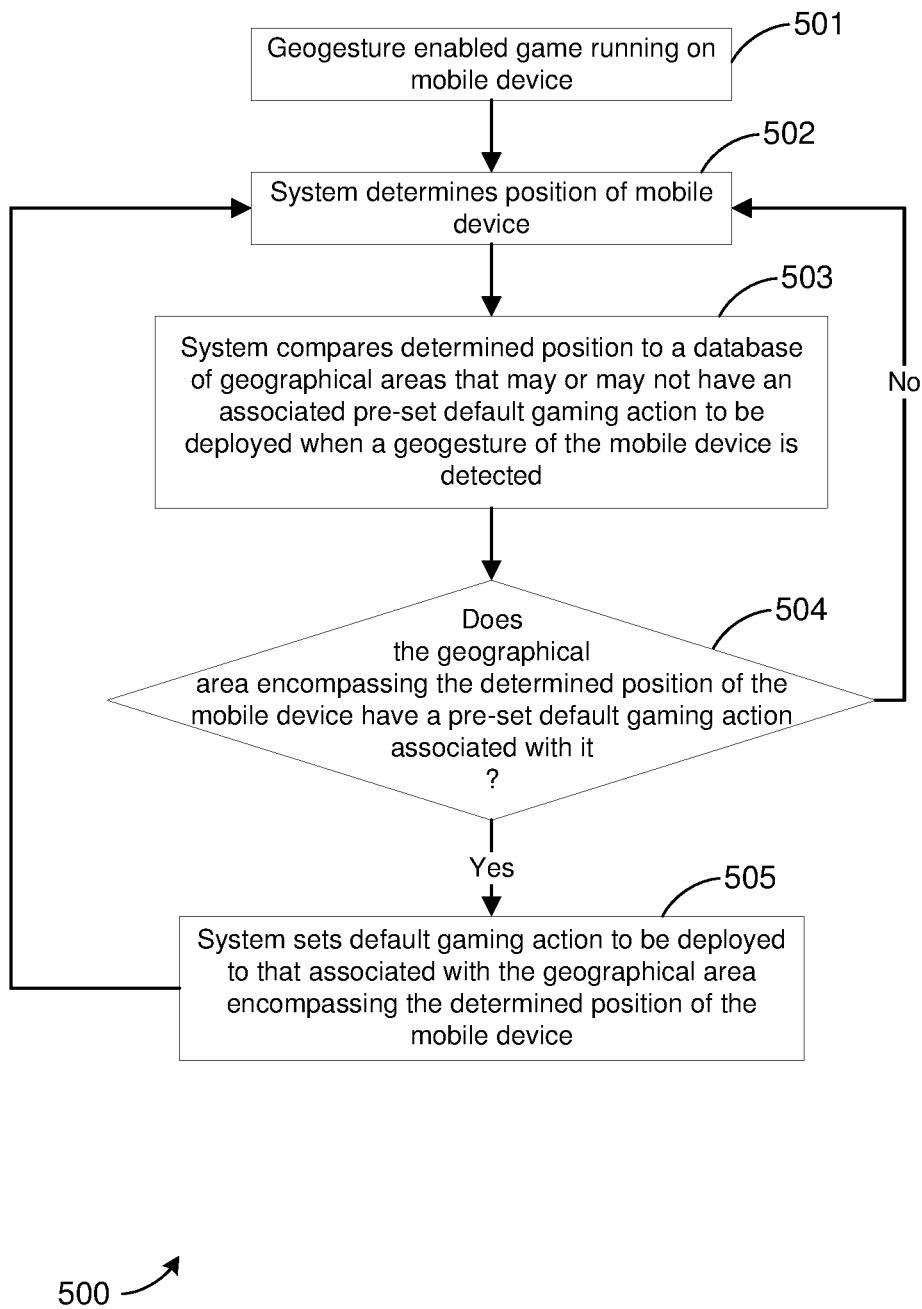
FIG. 5 is a flowchart illustrating a process for determining a default game move input from a gesture and a device position, according to an embodiment.

FIG. 5 is a flowchart 500 that describes a method of the invention in which the determined position of the user device is utilized to set a default game move to be deployed when a geogesture of the user device is detected when the position of the user device is encompassed by a specific geographical area that has an associated default game move. In step 501 a geogesture enabled game is running on a user device. The flowchart then branches to step 502. In step 502 the system determines the position of the user device. The flowchart then branches to step 503. In step 503 the system compares the determined position to a database of geographical areas that may or may not have an associated pre-set default game move to be deployed when a geogesture of the user device is detected. The flowchart then branches to step 504. In step 504 the system determines if the determined position is encompassed by a geographical area that has a default game move associated with it. If the geographical area does not have a default game move to be deployed when a geogesture is detected associated with it the flowchart branches back to step 502. If the geographical area does have a default game move to be deployed when a geogesture is detected associated with it the flowchart branches to step 505. In step 505 the system sets default game move to be deployed to that associated with the geographical area encompassing the determined position of the user device. The flowchart then branches back to step 502.

Figure 6:
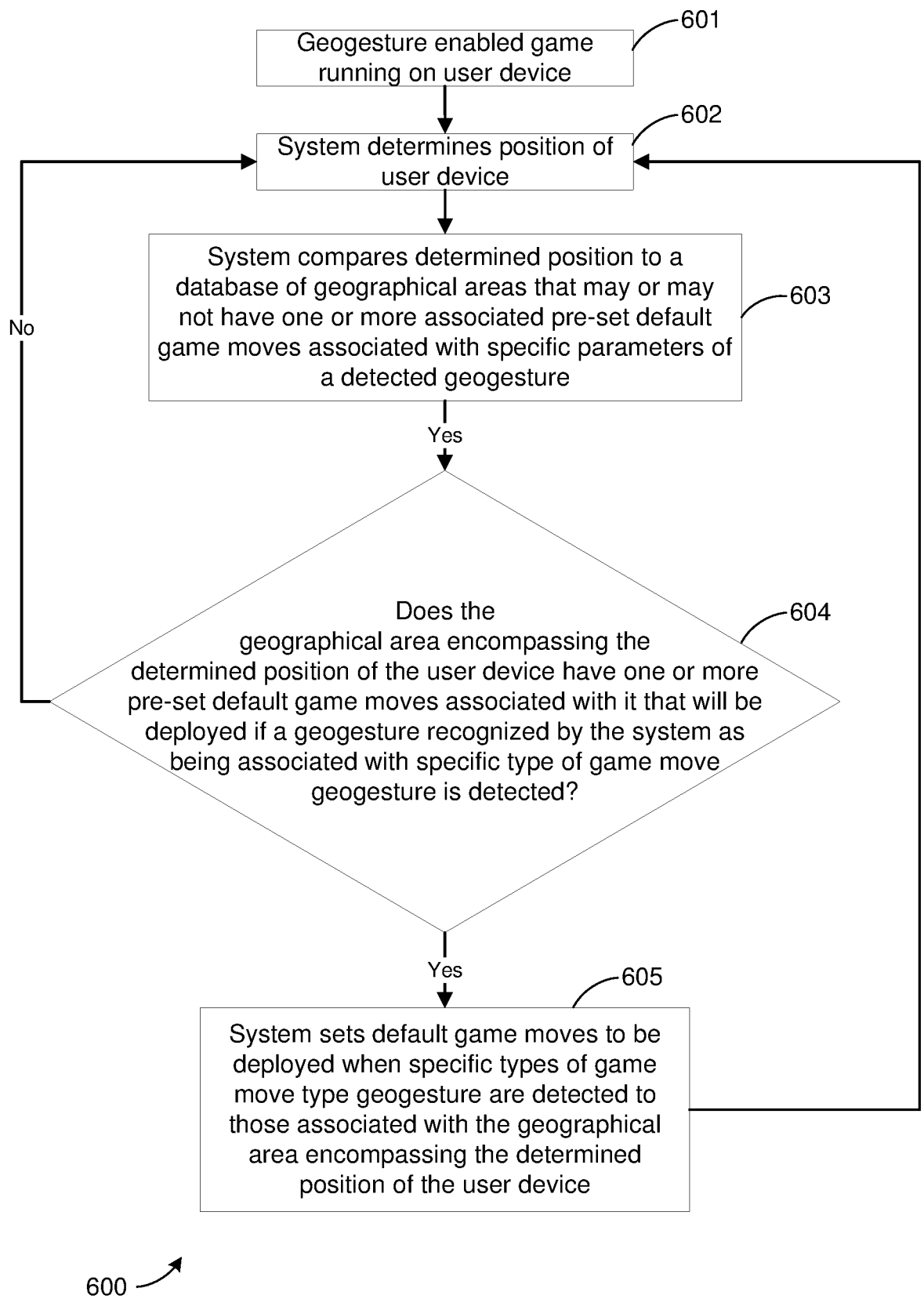
FIG. 6 is a flowchart illustrating a process for determining a multiple default game move inputs from a gesture and a device position, according to an embodiment.

FIG. 6 is a flowchart 600 that describes a more advanced method in which a determined position of a user device is utilized to set a default game move for each type of game move (e.g., Look, Launch, Leave and React) associated with a detected geogesture in the game environment. In step 601 a geogesture enabled game is running on a user device. The flowchart then branches to step 602. In step 602 the system determines the position of the user device. The flowchart then branches to step 603. In step 603 the system compares the determined position to a database of geographical areas that may or may not have an associated pre-set default game move to be deployed when a geogesture of the user device is detected. The flowchart then branches to step 604. In step 604 the system determines if the geographical area encompassing the determined position of the user device has one or more pre-set default game moves associated with it that will be deployed if a geogesture recognized by the system as being associated with specific type of game move geogesture is detected. If the geographical area encompassing the position of the user device does not have one or more such default game moves to be deployed when a geogesture is detected associated with it the flowchart branches back to step 602. If the geographical area encompassing the position of the user device does have one or more such default game moves to be deployed when a such geogesture is detected associated with it, the flowchart branches to step 605 in which the system sets the default game move or moves to be deployed when specific types of game move type geogestures are detected to those associated with the geographical area encompassing the determined position of the user device.

Figure 7:
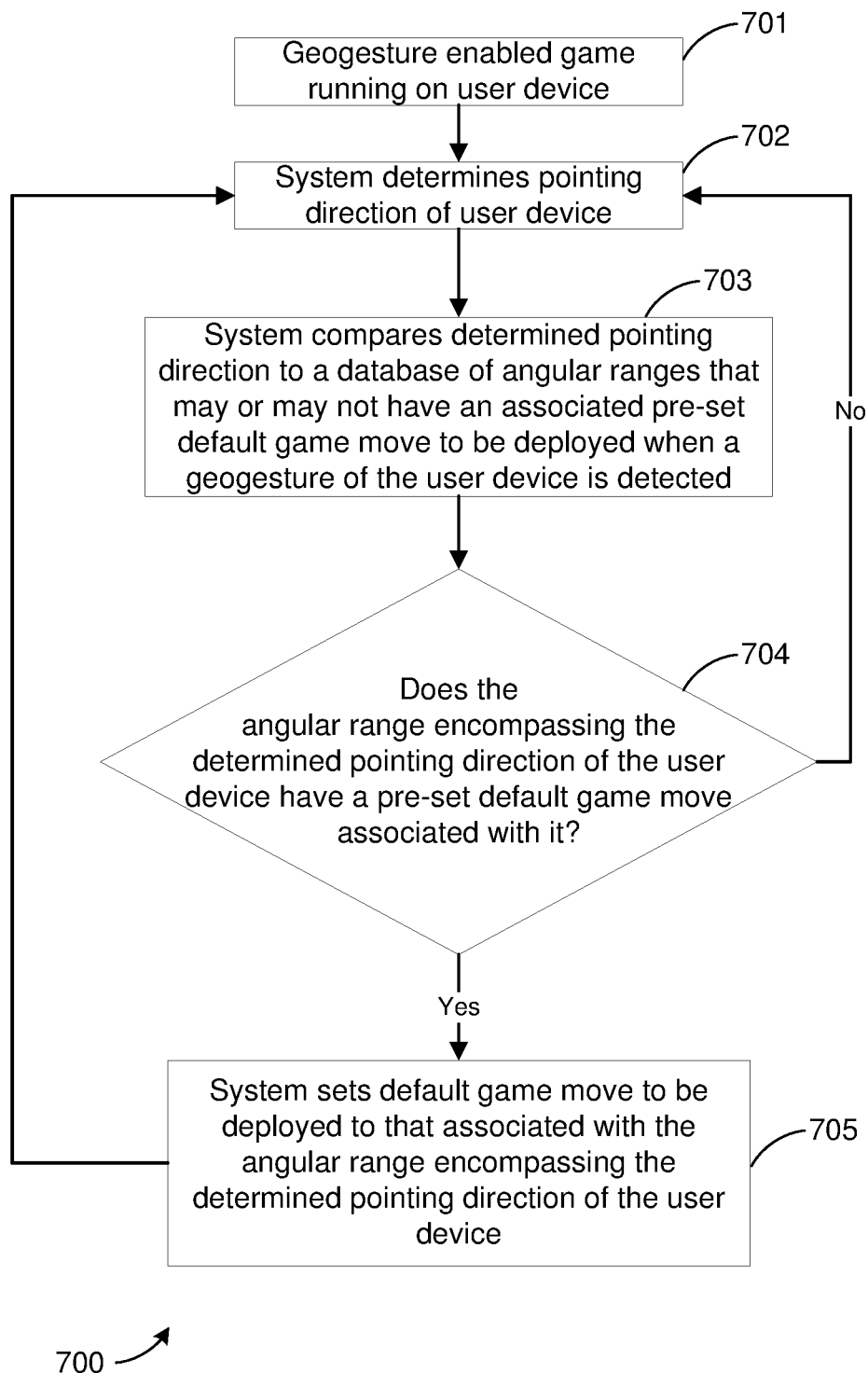
FIG. 7 is a flowchart illustrating a process for determining a default game move input from a gesture and a device pointing direction, according to an embodiment.

FIG. 7 is a flowchart 700 that describes a method of the invention in which the determined pointing direction of the user device is utilized to set a default game move to be deployed when a geogesture of the user device is detected when the pointing direction of the user device is encompassed by a specific angular range that has an associated default game move. In step 701 a geogesture enabled game is running on a user device. The flowchart then branches to step 702. In step 702 the system determines the pointing direction of the user device. The flowchart then branches to step 703. In step 703 the system compares the determined pointing direction of to a database of angular ranges that may or may not have an associated pre-set default game move to be deployed when a geogesture of the user device is detected. The flowchart then branches to step 704. In step 704 the system determines if the determined pointing direction of is encompassed by an angular range that has a default game move associated with it. If the angular range does not have a default game move to be deployed when a geogesture is detected associated with it the flowchart branches back to step 702. If the angular range does have a default game move to be deployed when a geogesture is detected associated with it the flowchart branches to step 705. In step 705 the system sets default game move to be deployed to that associated with the angular range encompassing the determined pointing direction of the user device. The flowchart then branches back to step 702.

Figure 8:
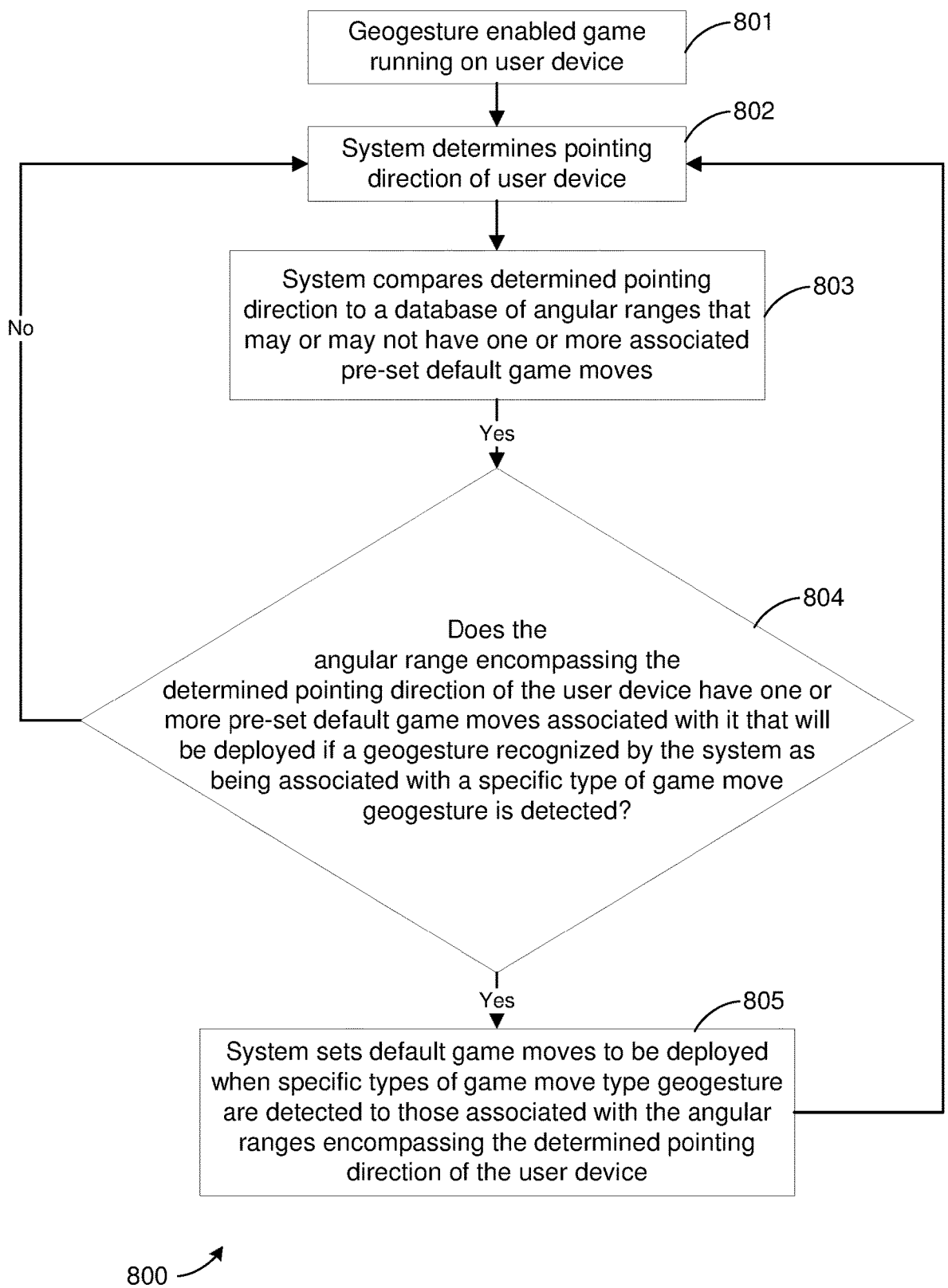
FIG. 8 is a flowchart illustrating a process for determining a multiple default game move inputs from a gesture and a device pointing direction, according to an embodiment.

FIG. 8 is a flowchart 800 that describes a more advanced method of the invention in which the determined pointing direction of the user device is utilized to set a default game move for each type of game move associated with a geogesture in the game environment. In step 801 a geogesture enabled game is running on a user device. The flowchart then branches to step 802. In step 802 the system determines the pointing direction of the user device. The flowchart then branches to step 803. In step 803 the system compares the determined pointing direction to a database of angular ranges that may or may not have an associated pre-set default game move to be deployed when a geogesture of the user device is detected. The flowchart then branches to step 804. In step 804 the system determines if the angular range encompassing the determined pointing direction of the user device has one or more pre-set default game moves associated with it that will be deployed if a geogesture recognized by the system as being associated with specific type of game move geogesture is detected. If the angular range encompassing the pointing direction of the user device does not have one or more such default game moves to be deployed when a geogesture is detected associated with it the flowchart branches back to step 802. If the angular range encompassing the pointing direction of the user device does have one or more such default game moves to be deployed when a such geogesture is detected associated with it, the flowchart branches to step 805 in which the system sets the default game move or moves to be deployed when specific types of game move type geogestures are detected to those associated with the angular range encompassing the pointing direction of the user device.

Figure 9:
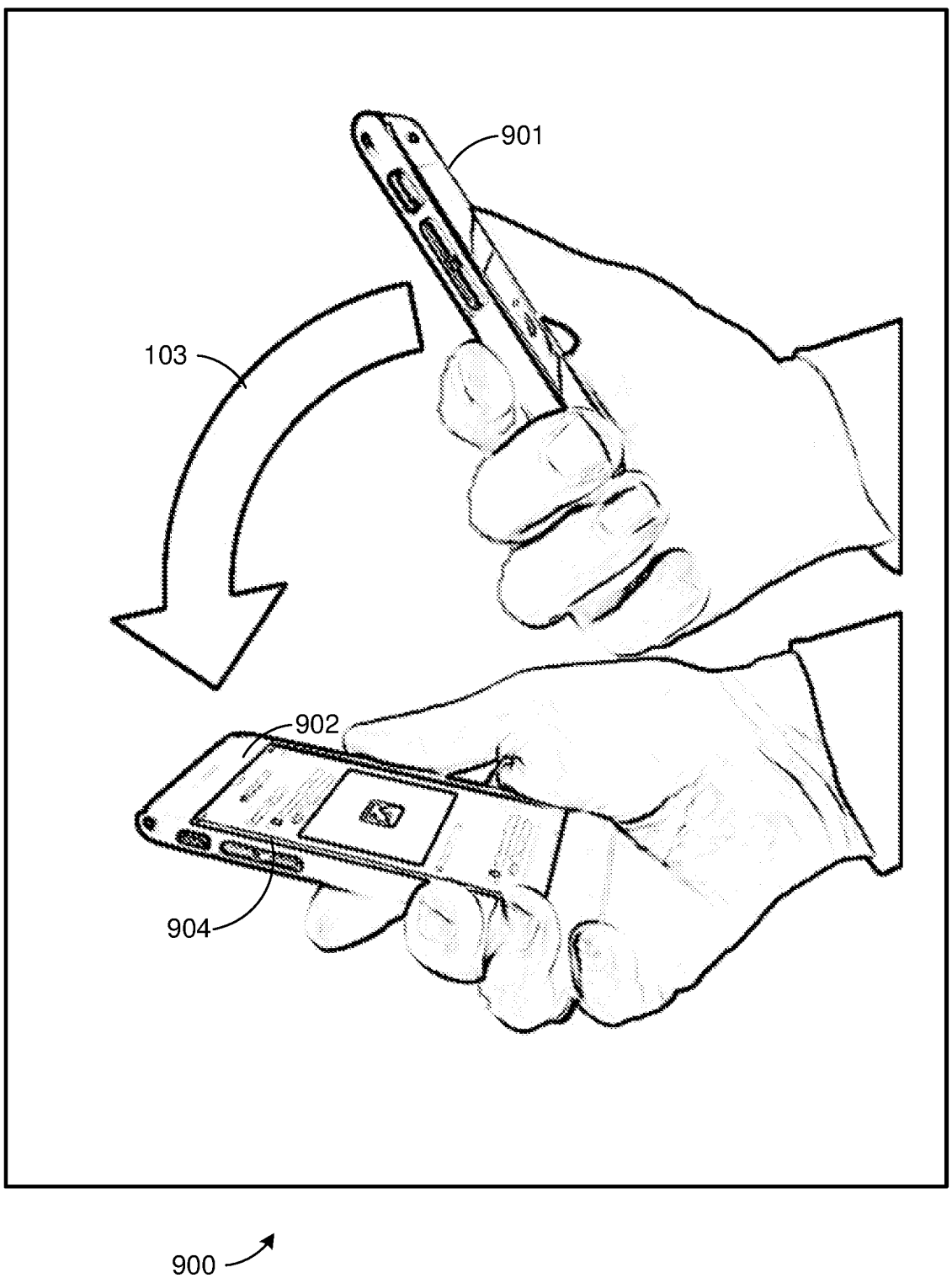
FIG. 9 is an image illustrating a possible physical motion of a cast.

FIG. 9 is an image 900 illustrating a possible physical motion of a cast. In FIG. 9, an electronic device, such as a mobile phone, is shown in two positions, at the start of a cast 901 and the end of a cast 902. The motion between the two positions is shown as an arrow 903. As shown, the motion is in the vertical plane. In some implementations, motion in the horizontal plane may trigger a cast. This motion may be registered as a rate of change through an angle traversed, an actual angular change, or a combination of the two. The results of the search for the cast then may be displayed on the screen 904 of the electronic device. If the motion does not meet a threshold (e.g., rate of change or angular motion) in the horizontal and/or vertical planes, the motion may not register as a cast and thus the motion may be ignored. The threshold may be pre-defined or pre-set. In one or more implementations, the threshold is dynamically determined based on typical movement of the electronic device.

Figure 10:
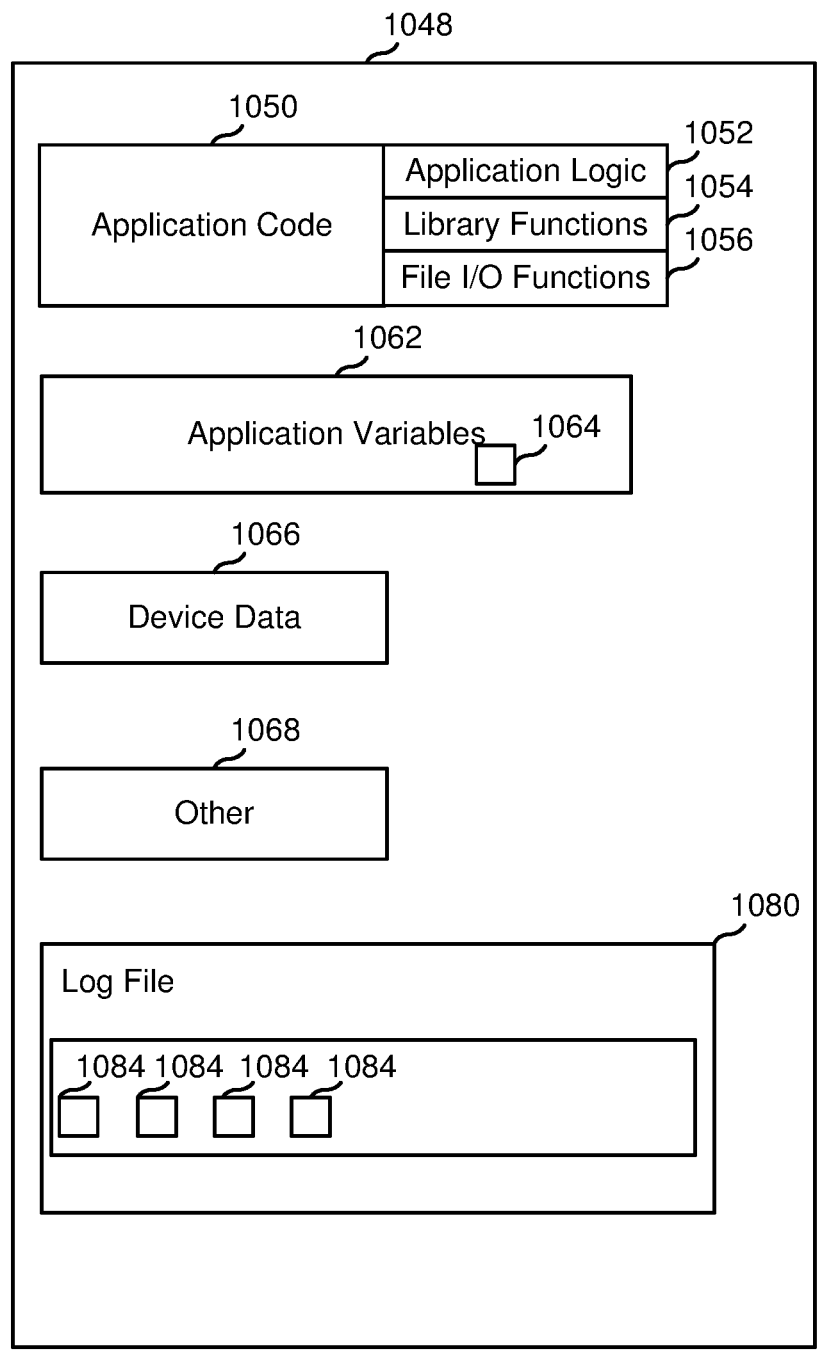
FIG. 10 illustrates an example computer system memory structure as might be used in performing methods described herein, according to various embodiments.

FIG. 10 illustrates an example of data structures that might be present in memory or storage accessible to computer processors. In some embodiments, the data structures are used by various components and tools, some of which are described in more detail herein. The data structures and program code used to operate on the data structures may be provided and/or carried by a transitory computer readable medium, e.g., a transmission medium such as in the form of a signal transmitted over a network.

According to some embodiments, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying data that includes data having been processed by the methods described herein. The carrier medium can comprise any medium suitable for carrying the data, including a storage medium, e.g., solid-state memory, an optical disk or a magnetic disk, or a transient medium, e.g., a signal carrying the data such as a signal transmitted over a network, a digital signal, a radio frequency signal, an acoustic signal, an optical signal or an electrical signal.

Figure 11:
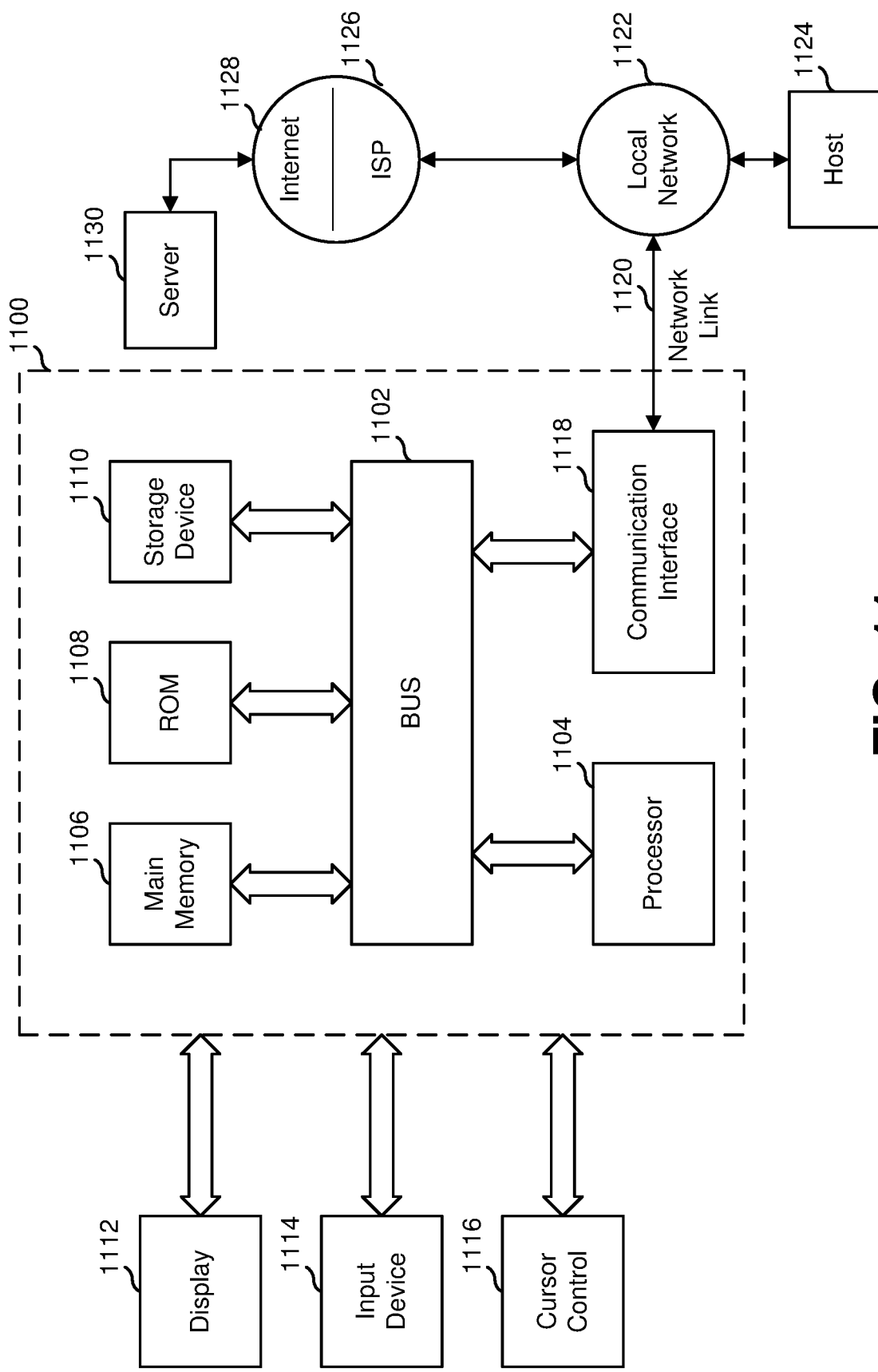
FIG. 11 is a block diagram illustrating an example computer system upon which the systems illustrated in FIGS. 1 and 10 may be implemented, according to various embodiments.

FIG. 11 is a block diagram that illustrates a computer system 1100 upon which the computer systems of the systems described herein and/or data structures shown in FIG. 10 may be implemented. Computer system 1100 includes a bus 1102 or other communication mechanism for communicating information, and a processor 1104 coupled with bus 1102 for processing information. Processor 1104 may be, for example, a general-purpose microprocessor.

Computer system 1100 also includes a main memory 1106, such as a random-access memory (RAM) or other dynamic storage device, coupled to bus 1102 for storing information and instructions to be executed by processor 1104. Main memory 1106 may also be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a computer monitor, for displaying information to a computer user. An input device 1114, including alphanumeric and other keys, is coupled to bus 1102 for communicating information and command selections to processor 1104. Another type of user input device is a cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a network connection. A modem or network interface local to computer system 1100 can receive the data. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be a network card, a modem, a cable modem, or a satellite modem to provide a data communication connection to a corresponding type of telephone line or communications line. Wireless links may also be implemented. In any such implementation, communication interface 1118 sends and receives electrical, electromagnetic, or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world-wide packet data communication network now commonly referred to as the "Internet" 1128. Local network 1122 and Internet 1128 both use electrical, electromagnetic, or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120, and communication interface 1118. In the Internet example, a server 1130 might transmit a requested code for an application program through the Internet 1128, ISP 1126, local network 1122, and communication interface 1118. The received code may be executed by processor 1104 as it is received, and/or stored in storage device 1110, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for generating inputs to a game software application, comprising: under the control of one or more computer systems configured with executable instructions:
    (a) obtaining sensor inputs from a set of sensors of a user device, the set of sensors comprising a first set of sensors and a second set of sensors;
    (b) determining, from a first set of signals from the first set of sensors, and from a gesture definitions ruleset, a gesture, wherein the gesture corresponds to a game input in a real-world geographical area;
    (c) determining, from a second set of signals from the second set of sensors, a position data structure corresponding to position details of the user device, wherein the position details and the position data structure include an indication of an orientation of the user device when the gesture was performed;
    (d) determining, from the gesture and the position data structure, a geogesture of the user device, wherein the geogesture includes a location of the user device in a real-world geographical area and the orientation of the user device in the real-world geographical area;
    (e) generating a geogesture message corresponding to the geogesture of the user device;
    (f) providing the geogesture message to a game move determining module;
    (g) determining, from the geogesture message and a gesture-to-move mapping table, a game move, wherein the game move is driven by the game input including a pointing direction of the user device in the real-world geographical area;
    (h) generating a game move message containing an indication of the game move and a geospatial state of the user device, wherein the indication of the game move includes gesturing towards a geolocated object in the real-world geographical area; and
    (i) providing the game move message to an input portion of the game software application.

2. A computer system for generating one or more operations of a game software application, the computer system comprising:
    at least one processor; and
    a computer-readable medium storing instructions, which when executed by the at least one processor, causes the computer system to:
    (a) obtain sensor inputs from a set of sensors of a user device, the set of sensors comprising a first set of sensors and a second set of sensors;
    (b) determine, from a first set of signals from the first set of sensors, and from a gesture definitions ruleset, a gesture, wherein the gesture corresponds to a game input in a real-world geographical area;
    (c) determine, from a second set of signals from the second set of sensors, a position data structure corresponding to position details of the user device;
    wherein the position details and the position data structure include an indication of an orientation of the user device when the gesture was performed;
    (d) determining, from the gesture and the position data structure, a geogesture of the user device, wherein the geogesture includes a location of the user device in a real-world geographical area and the orientation of the user device in the real-world geographical area;
    (e) generating a geogesture message corresponding to the geogesture of the user device;
    (f) provide the geogesture message to a game move determining module;

(g) determine, from the geogesture message and a gesture-to-move mapping table, a game move, wherein the game move is driven by the game input including a pointing direction of the user device in the real-world geographical area;

(h) generate a game move message containing an indication of the game move and a geospatial state of the user device, wherein the indication of the game move includes gesturing towards a geolocated object in the real-world geographical area; and (i) provide the game move message to an input portion of the game software application.

3. A non-transitory computer-readable storage medium storing instructions, which when executed by at least one processor of a computer system, causes the computer system to:

(a) obtain sensor inputs from a set of sensors of a user device, the set of sensors comprising a first set of sensors and a second set of sensors;

(b) determine, from a first set of signals from the first set of sensors, and a gesture definitions ruleset, a gesture, wherein the gesture corresponds to a game input in a real-world geographical area;

(c) determine, from a second set of signals from the second set of sensors, a position data structure corresponding to position details of the user device, wherein the position details and the position data structure include an indication of an orientation of the user device when the gesture was performed;

(d) determining, from the gesture and the position data structure, a geogesture of the user device, wherein the geogesture includes a location of the user device in a real-world geographical area and the orientation of the user device in the real-world geographical area;

(e) generating a geogesture message corresponding to the geogesture of the user device;

(f) provide the geogesture message to a game move determining module;

(g) determine, from the geogesture message and a gesture-to-move mapping table, a game move, wherein the game move is driven by the game input including a pointing direction of the user device in the real-world geographical area;

(h) generate a game move message containing an indication of the game move and a geospatial state of the user device, wherein the indication of the game move includes gesturing towards a geolocated object in the real-world geographical area; and (i) provide the game move message to an input portion of a game software application.

* * * * *

UNITED STATES PATENT AND TRADEMARK OFFICE
CERTIFICATE OF CORRECTION

PATENT NO. : 12,296,260 B1
APPLICATION NO. : 17/463413
DATED : May 13, 2025
INVENTOR(S) : Ganesan Venkatakrishnan et al.

Page 1 of 1

It is certified that error appears in the above-identified patent and that said Letters Patent is hereby corrected as shown below:

In the Claims

Claim 1, Column 16, Lines 52 to 57, change:
"(c) determine, from a second set of signals from the second set of sensors, a position data structure corresponding to position details of the user device;
wherein the position details and the position data structure include an indication of an orientation of the user device when the gesture was performed;"

To:
--(c) determine, from a second set of signals from the second set of sensors, a position data structure corresponding to position details of the user device, wherein the position details and the position data structure include an indication of an orientation of the user device when the gesture was performed;--

Signed and Sealed this
First Day of July, 2025

Coke Morgan Stewart
*Acting Director of the United States Patent and Trademark Office*